Feb. 23, 1960

E. G. WALSH 2,925,646

METHOD OF PRODUCING ELECTRICAL CONDUCTORS

Filed Feb. 21, 1957

INVENTOR
E. G. WALSH
BY
ATTORNEY 2,925,646

METHOD OF PRODUCING ELECTRICAL CONDUCTORS

Edward G. Walsh, Madison, N.J., assignor to Bell Telephone Laboratories, Incorporated, New York, N.Y., a corporation of New York Application February 21, 1957, Serial No. 641,683
4 Claims. (Cl. 29—155.5)

Figure 1:
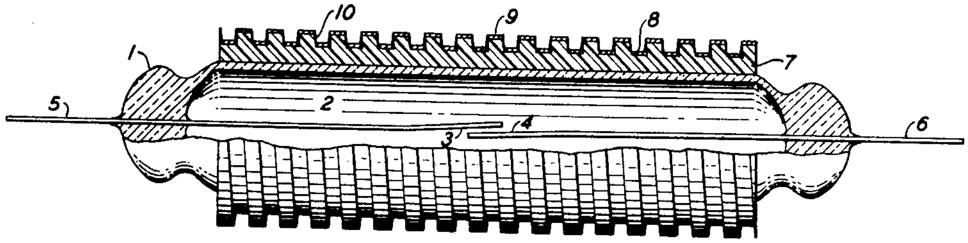

This invention relates to methods of forming electrically conductive coils and, more particularly, to methods of forming coils used in electromagnetic relays, especially for relays of the sealed reed type such as disclosed, for example, in Patent 2,264,746, granted December 2, 1941, to W. B. Ellwood, and in Patent 2,397,123, granted March 26, 1946, to J. T. L. Brown.

The development of electronic switching systems and the resulting widespread use of miniature switching components has emphasized the need for miniaturized relays, particularly relays of the sealed reed type. The mass production of sealed reed relays that are acceptable both in respect to cost of manufacture and in speed of operation involves problems that are particularly difficult to solve. Many of these problems have been met satisfactorily, with the result that miniature sealed reed relays can now be mass produced at reasonably low cost. However, the present trend toward further miniaturization of apparatus has created additional problems, particularly with respect to the efficient mass production of inexpensive coils for sealed reed relays.

Probably the most effective means employed heretofore for the mass production of conventional type wire wound coils for miniature sealed reed relays is using the relay envelope itself as a wire wrapping mandrel. This procedure, however, requires the relatively expensive and complex techniques of mechanized wiring. Similarly, the application of known printed circuit techniques does not at present appear to offer a satisfactory solution to the problem of producing high speed miniature sealed reed relay coils in quantity at a reasonable cost.

An object of this invention is to provide an efficient and economical method of manufacturing electrically conductive coils for electromagnetic relays.

A more specific object of this invention is to provide an efficient and economical method of manufacturing electrically conductive coils for sealed reed electromagnetic relays.

A further object of this invention is to provide a method of manufacturing coils for sealed reed relays that is particularly adapted to the techniques of mass production. A further object of this invention is to provide a method of producing coils for sealed reed relays without the need of applying mechanized wiring techniques.

In accordance with one feature of the invention a mandrel is coated with a layer of deformable insulating material as a base for the turns of an electrically conductive coil.

In accordance with a further feature of the invention a relatively thin layer of conductive material is plated on the outside of a cylindrical layer of deformable insulating material and a coil of conductive film is depressed into the insulating layer.

In accordance with a further feature of the invention a plurality of insulatedly separated coils are formed by successive layers of deformable insulating material and convolutions of conductive material depressed into the insulating material from successive layers of conductive film.

In one embodiment of the invention the features of the invention are employed in the manufacture of a coil specifically designed for a sealed reed relay.

Figure 2:
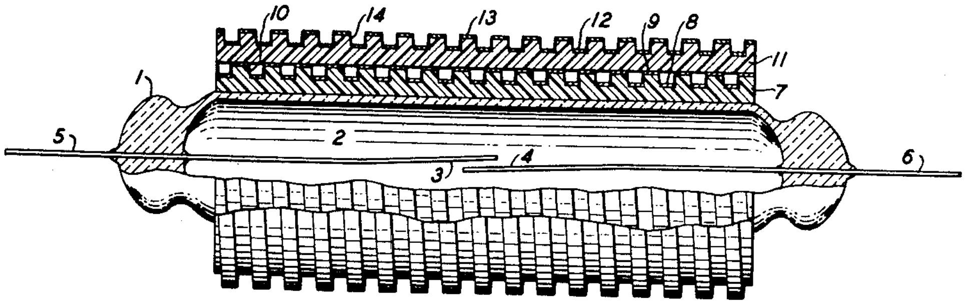

These and other objects and features of the invention will be more fully understood by considering the following detailed description, together with the accompanying drawings in which:

Fig. 1 shows an embodiment, partially in cross section, in which the novel processes of the invention have been employed to produce a single set of parallel windings which comprise the coil of a sealed reed switch; and Fig. 2 shows an embodiment, partially in cross section, in which the novel processes of the invention have been employed to produce a double set of parallel windings which comprise the coil of a sealed reed switch.

Referring to Fig. 1, the sealed reed switch illustrated comprises glass envelope 1 enclosing evacuated switch cavity 2, and switch contacts 3 and 4 terminating respectively in outside leads 5 and 6. Principles of operation of a sealed reed switch, well known by persons skilled in the art, include passing an electric current through a coil surrounding the evacuated switch chamber, thereby establishing a magnetic field. The switch contacts may be made to operate in response to the action of the magnetic field in a number of ways, for example, by constructing one contact of magnetic material and the second contact of nonmagnetic material. A great number of variations of the switches illustrated are known in the art including, for example, switches with both make and break contacts. The novel principles of the coil, as disclosed herein, may be employed with advantage in most of the known types of sealed reed switches.

The coil of Fig. 1 is constructed by first enclosing glass envelope 1 with a layer of deformable insulating material 7. The thickness of the layer depends on the design parameters established for the particular relay. The material employed for the insulating layer may advantageously be any one of a number of synthetic materials, for example, a variety of polyethylene, a resin of the alkyd varnish group or a material of the oil modified phenolic group. A number of other suitable deformable insulating materials may be used with equal success. The application of insulating layer 7 to glass envelope 1 may be effected by a variety of means dependent upon the particular insulating material employed. These means include spraying envelope 1 or dipping it into the insulating material when the material can be used in its liquid state. In other instances, for example in the use of polyethylene, a preformed fitted hollow cylinder thereof may be slipped over the glass envelope.

The next step in forming the coil in accordance with the principles of the invention is to apply a relatively thin coating of electrically conductive material on the outside of insulating layer 7. As in the case of the insulating layer, the thickness of the conducting layer will depend on the design parameters of the particular relay. Also, design considerations will determine the choice of the particular type of conductive material to be used. In some cases silver paint will be most desirable; in other cases nickel or copper applied by spraying or by chemical deposition will be preferable.

Fig.1 shows the electrically conductive layer after it has been subjected to a depressing process by which separate and distinct parallel windings 8 and 9 have been formed. The original level of the conductive layer prior to the depressing process was the same as that shown for winding 9. Winding 8 represents that portion of the conductive layer which has been depressed into deformable insulating layer 7. The depth of the depression 10 should preferably be in the order of twice the thickness of the original layer of electrically conductive material.

Various methods are available which may be used successfully in the depressing process. One method, for example, employs machine thread rolling techniques in which the glass envelope, covered by its insulating layer, in turn covered by its conductive layer, is passed through a pair of thread rolling plates in much the same manner as is used in the manufacture of machine threads on metal stock. Fig. 1 illustrates the effect of the use of thread rolling plates designed for the production of square threads. Other configurations may of course be equally desirable.

Another method of depressing spiral convolutions of the conductive material is the use of a flat edged roller mounted on a screw shaft, which is in spaced relation with and parallel to the axis of the sealed reed switch. As the roller turns and advances down its screw shaft and the switch envelope is rotated, convolutions of the conductive material will be spirally depressed into the insulating material. In both of the methods noted, sharp clean edges on the depressing devices are of course required to insure that the parallel windings will be insulatedly separate. In a particular relay installation it may be desirable to insulate the outer surface of the conductive winding. This may of course be easily accomplished through the use of one of the techniques noted hereinabove, whereby an insulating layer may be applied by dipping or spraying.

Connecting terminal arrangements for the windings of the coil have not been shown but may be arranged in a variety of ways known in the art.

It will be noted that the types of production techniques suggested for effecting the various steps of coil manufacture in accordance with the principles of the invention are well suited for use in the mass production of coils. Moreover, these techniques are considerably less complex and less expensive than those required for the mass production of wire wound coils.

Fig. 2 illustrates a double set of parallel windings which may also be applied in accordance with the principles of the invention. Using essentially the same techniques as noted hereinabove, a second insulating layer 11 has been applied to cover the set of parallel windings 8 and 9. A layer of conductive material has been applied to insulating layer 11 and then partially depressed to form spiral insulatedly separate convolutions 12 and 13. Such an arrangement may be desirable in cases where magnetic flux requirements cannot be met adequately by a single pair of parallel windings. Again, terminal connections of the windings have not been illustrated but may be properly arranged in a variety of ways known in the relay art.

Whether single or multiple sets of parallel windings are employed, a relay constructed in accordance with the principles of the invention has important advantages in addition to those noted hereinabove. It will be appreciated that the size of the conductor employed for the coil becomes particularly critical in the case of relay miniaturization. While in the case of conventional wire wound coils, cost considerations may limit the designer to the selection of a particular standardized wire, a much greater degree of engineering freedom is allowed in the selection of the size, configuration, conductivity and composition of a coil constructed in accordance with the principles of the invention. In like manner, the composition and thickness of the insulation, and hence its dielectric strength can be easily and closely controlled. Hence, significant savings in cost can be realized by closely matching the materials used to the design requirements of the relay.

Operating characteristics of a particular relay constructed in accordance with the principles of the invention have been measured and found to be satisfactory. These include an operate time of 0.1 millisecond with 30 ampere turns requiring power in the order of 15 milliwatts. Exceptional sensitivity, exceptional speed, unusually small size and very low cost were among the advantages noted.

It is to be understood that the above-described arrangements are illustrative of the application of the principles of this invention. Numerous other arrangements may be devised by those skilled in the art without departing from the spirit and scope of the invention.

What is claimed is:

1. The method of manufacturing plural windings for a relay of the type wherein a plurality of contact members are sealed in an elongated tubular envelope, said method consisting of the steps of covering said envelope with a first layer of deformable insulating material, covering said first layer with a first film of conductive material and depressing a spiral portion of said first film into said first layer as a first coil, said first coil being insulatedly separated from the remainder of said first film, covering said first film and said first coil with a second layer of deformable insulating material, covering said second layer of deformable insulating material with a second film of conductive material, and depressing said second film as a second coil upon said second layer, said second coil being insulatedly separated from said first film and insulatedly separated from the remainder of said second film thereby to form four insulatedly separate windings on said tubular envelope.

2. The method of producing a plurality of electrically conductive convolutions on the exterior of an insulator, which consists of the steps of covering a first supporting surface of deformable insulating material with a first film of conductive material and depressing a spiral portion of said film into said first supporting surface, said spiral portion forming with the remainder of said first film electrically conductive and insulatedly separated windings, covering said first film with a second supporting surface of deformable insulating material, covering said second supporting surface with a second film of conductive material and depressing a spiral portion of said second film into said second supporting surface, said spiral portion of said second film forming with the remainder of said second film electrically conductive and insulatedly separated windings.

3. The method of producing a plurality of electrically conductive convolutions on the exterior of an insulator, which consists of the steps of covering a first supporting surface of deformable resilient insulating material with a first film of conductive material, depressing a spiral portion of said first film into said first supporting surface, said spiral portion of said first film forming with the remainder of said first film electrically conductive and insulatedly separated windings, covering said first film with at least one layer comprising an additional supporting surface of deformable insulating material and an additional film of conductive material thereover with a spiral portion of said additional film depressed into said additional supporting surface, said spiral portion of said additional film forming with the remainder of said additional film electrically conductive and insulatedly separated windings.

4. The method of producing plural windings for a relay of the type wherein a plurality of contact members is sealed in an envelope, said method consisting of the steps of covering said envelope with a first layer of deformable insulating material, covering said first layer of deformable insulating material with a first film of conductive material, depressing a spiral portion of said first film into said layer as a first coil, said first coil being insulatedly separated from the remainder of said first film, covering said first film with at least one additional layer comprising a second layer of deformable insulating material covered thereover with a second film of conductive material with a spiral portion of said second film depressed into said second layer of deformable insulating material as a second coil insulatedly separated from said first film and insulatedly separated from the remainder of said second film, thereby to form at least four electrically conductive coils separated by said insulating material.

References Cited in the file of this patent

UNITED STATES PATENTS

| | | |
|---|---|---|
| 1,767,715 | Stoekle | June 24, 1930 |
| 1,820,240 | Michell | Aug. 25, 1931 |
| 2,543,384 | Squier | Feb. 27, 1951 |
| 2,716,268 | Steigerwalt | Aug. 30, 1955 |

FOREIGN PATENTS

| | | |
|---|---|---|
| 687,094 | France | Aug. 4, 1930 |